United States Patent [19]

Iwasa et al.

[11] Patent Number: 5,456,749
[45] Date of Patent: Oct. 10, 1995

[54] ANTI-DISCOLORING PEARLY LUSTER PIGMENT AND METHOD OF PREPARING THE SAME

[75] Inventors: Kazuhisa Iwasa, Kami Yunagaya; Katsuhisa Nitta, Iwaki; Tamio Noguchi, Kami Yunagaya, all of Japan

[73] Assignee: Merck Patent Gesellschaft mit Beschrankter Haftung, Darmstadt, Germany

[21] Appl. No.: 204,195

[22] PCT Filed: Jun. 24, 1993

[86] PCT No.: PCT/EP93/01617

§ 371 Date: Mar. 1, 1994

§ 102(e) Date: Mar. 1, 1994

[87] PCT Pub. No.: WO94/01498

PCT Pub. Date: Jan. 20, 1994

[30] Foreign Application Priority Data

Jul. 2, 1992 [JP] Japan ................ 4-213146

[51] Int. Cl.⁶ .................................. C04B 14/20
[52] U.S. Cl. .................. 106/417; 106/425; 106/426; 106/428; 106/442; 524/449
[58] Field of Search ............................ 106/417, 442, 106/425, 426, 428; 524/449

[56] References Cited

U.S. PATENT DOCUMENTS

| | | | |
|---|---|---|---|
| 3,087,828 | 4/1963 | Linton et al. | 106/417 |
| 3,087,829 | 4/1963 | Linton et al. | 106/417 |
| 4,537,636 | 8/1985 | Bernhard et al. | 106/417 |
| 4,956,019 | 9/1990 | Noguchi et al. | 106/417 |
| 5,022,923 | 6/1991 | Rau et al. | 106/417 |
| 5,266,107 | 11/1993 | Hoffman | 106/417 |

FOREIGN PATENT DOCUMENTS 256417  8/1987  European Pat. Off. .

OTHER PUBLICATIONS

Abstract of JP 1,158,077. Derwent AN 89–223232, Nov. 1987.
Verified Translation of PCT/EP92/01295, Jul., 1992.
Chemical Abstracts, vol. 107; 107:79502z of JP 60(6), 333–341, Okazaki, Shikizai Kyokaishi, 1987 no month.
Jagnandan et al., "Isolation and Identification of 3,3',5, 5'–Tetra . . . ", J. of Pharm. Sci. vol. 68, No. 7, Jul. 1979, pp. 916–917.
J. Matr. Sci., Jul. 1977 pp. 320–324 (12):7, Allen et al. "Photo–oxidation of commercial PE–Cont'g $TiO_2$ (rutile)/ antioxidant systems".

Primary Examiner—Mark L. Bell
Assistant Examiner—Scott L. Hertzog
Attorney, Agent, or Firm—Millen, White, Zelano, & Branigan

[57] ABSTRACT

Disclosed is an anti-discoloring pearly luster pigment of white titanium dioxide-coated mica grains wherein; (a) the surfaces of the titanium dioxide and/or titanium oxide hydrate coated mica particles are coated with from 1 to 7 parts by weight, to 100 parts by weight of the titanium dioxide and/or titanium oxide hydrate coated mica particles, of a silicon oxide and/or silicon oxide hydrate; (b) the surfaces of the coated grains are further coated with from 0.5 to 5 parts by weight, to 100 parts by weight of the mica titanium dioxide and/or titanium oxide hydrate coated particles, of an aluminium oxide and/or aluminum oxide hydrate; and (c) the surfaces of the coated particles are still further coated with from 0.5 to 3 parts by weight, to 100 parts by weight of the titanium dioxide and/or titanium oxide hydrate coated mica particles, of a zinc oxide and/or zinc oxide hydrate.

16 Claims, No Drawings

ANTI-DISCOLORING PEARLY LUSTER PIGMENT AND METHOD OF PREPARING THE SAME

FIELD OF THE INVENTION

The present invention relates to a pearly luster pigment with an anti-discoloring property and an excellent dispersing property, and to a method of preparing the same. The pigment of the present invention can be used as a pigment additive in preparation of plastic articles, inks, coating compositions and decorative boards.

BACKGROUND OF THE INVENTION

Recently, a titanium oxide resp. titanium oxide hydrate coated mica pigment as used as a colorant for resins has been found to have a problem of causing discoloration (especially, yellowing) of resins with the lapse of time so that the resulting resins lose their original color. This is due to the addition of additives of a hindered amine light stabilizer (HALS), a phenolic antioxidant such as BHT, a flame retarder and an ultraviolet stabilizer to resins, to the titanium oxide-coated mica. In this connection, it is known that where titanium dioxide resp. oxide hydrate is in a resin, the titanium dioxide is catalytically activated due to light or heat energy as imparted thereto to thereby promote the interaction of the additives, or that the titanium dioxide directly reacts with the additives to cause discoloration of so-called yellowing phenomenon. (S. Okazaki, *Colorants*, 6, 333–341 (1987); M. Seino, *Titanium Oxides* (published by Gihodo Publishing Co. ), pp. 103–106; I. Jagnandan, H. Daun, T. J. Ambrosis & S. G. Gilbert, *Journal of Pharmaceutical Science*, 68 (7) 916 (1979); N. S. Allen, D. J. Bullen and J. F. Keller, *Journal of Materials Science*, 12, 1320 (1977)).

Due to the phenomenon, containers, decorative boards and other articles to be manufactured from the resins containing the materials would discolor with the lapse of time, after stored, to eventually lose their original colors.

As a method of inhibiting the catalytic activity of titanium dioxide in order to evade the phenomenon, in general, there has been provided a technique of stabilizing titanium dioxide by doping one or more of chromium compounds, silicon compounds, aluminum compounds, zinc compounds, phosphoric acid compounds and zirconium compounds thereinto or by coating one or more of them thereover.

However, if such a surface-coating method is applied to a pearly luster pigment, in general, it would result in loss of the intrinsic luster of the pearly pigment since the amount of the coat is relatively large, i.e. from 5 to 20% by weight to the weight of the pigment as coated therewith. Japanese Patent Application Laid-Open No. 1-225669 has disclosed an organic acid-coated anti-yellowing titanium dioxide pigment. In the disclosed case, since the surface-treating agent is an organic material, the coated pigment may still have its pearly luster. However, with the lapse of time, the storage stability of the coated pigment becomes unsatisfactory.

SUMMARY OF THE INVENTION

The object of the present invention is to overcome the problems in the prior art techniques. Therefore, the present invention provides a novel pearly luster pigment having the following characteristics (1 ) to (3) and also a method of preparing the same.

(1) It has an excellent anti-discoloring property for a long period of time.

(2) It hardly coagulates and has a good dispersing property.

(3) It does not lose its pearly luster.

Specifically, the present invention provides an anti-discoloring pearly luster pigment on the basis of mica particles coated with titanium dioxide and/or titanium oxide hydrate wherein:

(a) the surfaces of the titanium dioxide and/or titanium oxide hydrate coated mica particles are coated with from 1 to 7 parts by weight, to 100 parts by weight of the titanium dioxide and/or titanium oxide hydrate coated mica particles, of a silicon oxide and/or silicon oxide hydrate;

(b) the surfaces of the coated grains are further coated with from 0.5 to 5 parts by weight, to 100 parts by weight of the titanium dioxide and/or titanium oxide hydrate coated mica particles, of an aluminum oxide and/or aluminum oxide hydrate; and (c) the surfaces of the coated particles are still further coated with from 0.5 to 3 pans by weight, to 100 pans by weight of the titanium dioxide and/or titanium oxide hydrate coated mica particles, of a zinc oxide and/or zinc oxide hydrate.

The present invention also provides a method of preparing an anti-discoloring pearly luster pigment, in which in a first step, titanium dioxide and/or titanium oxide hydrate coated mica particles are suspended in water or in which an aqueous solution of a titanium salt is added dropwise to an aqueous suspension of mica particles the pH of which is largely maintained at a constant value by simultaneous addition of a base, whereby titanium dioxide and/or titanium oxide hydrate is coated onto the surface of the mica particles, then in a second step, an aqueous solution of a silicate and an aqueous solution of an inorganic acid are simultaneously dropwise added to the suspension obtained in step 1 and stirred while maintaining the pH value of the suspension essentially constant whereby a silicon oxide and/or silicon oxide hydrate is coated over the surface of the titanium dioxide and/or titanium oxide hydrate coated mica particles, then in a third step an aqueous solution of an aluminum salt and an aqueous solution of an inorganic base are simultaneously dropwise added to the slurry resulting in step 2 and stirred while maintaining the pH value of the slurry essentially constant whereby an aluminum oxide and/or aluminum oxide hydrate is coated over the surfaces of the particles obtained in step 2, and further in a fourth step an aqueous solution containing a zinc salt and an aqueous solution of an inorganic base are simultaneously dropwise added to the resulting slurry and stirred while maintaining the pH value of the slurry essentially constant whereby a zinc oxide and/or zinc oxide hydrate is coated over the surfaces of the particles obtained in step 3, and thereafter the solids are taken out by filtration, washed with water and dried and optionally calcined.

DETAILED DESCRIPTION OF THE INVENTION

In the pearly luster pigment of the present invention, the amount of the titanium oxide and/or oxide hydrate coat preferably is from 0.5–250% by weight, in particular from 1–100% by weight and very specifically frown 5–60% by weight of $TiO_2$ with respect to the mass of the uncoated mica particles. The amount of the silicon oxide and/or oxide hydrate coat of the first layer to be coated over the surfaces of titanium dioxide resp. oxide hydrate coated mica particles is from 1 to 7 parts by weight to 100 parts by weight of the titanium dioxide and/or oxide hydrate coated mica particles. If the amount is less than 1 part by weight, tile pigment could not have an anti-discoloring property; but if it is more than 7 parts by weight, the pigment would lose the luster though it may have an anti-discoloring property. The amount of the aluminum oxide and/or oxide hydrate coat of the second layer over the pigment particles is from 0.5 to 5 parts by weight to 100 parts by weight of the titanium dioxide and/or oxide hydrate coated mica particles. If the amount is less than 0.5 part by weight, the pigment could not maintain the excellent dispersing property and luster; but if it is more than 5 parts by weight, the pigment would lose the luster. The mount of the zinc oxide and/or oxide hydrate coat of the third layer over the pigment particles is from 0.5 to 3 parts by weight to 100 parts by weight of the titanium dioxide and/or oxide hydrate coated mica particles. If the mount is less than 0.5 part by weight, the discoloring property of the pigment would be insufficient; but if it is more than 3 parts by weight, the safety of the pigment would be unfavorable.

In general, a silicon oxide is preferably used for imparting and anti-discoloring property to pigments and the like, but it has a coagulating property and the affinity thereof with resins is poor. Because of these reasons, it is unsuitable as an outer layer. On the other hand, an aluminum oxide is preferably used for imparting a dispersing property to pigments and, when compared with a silicate, it has a weaker coagulating property so that it is suitable as an outer layer. A zinc oxide is suitable as an outermost layer for the purpose of inhibiting discoloration due to interaction between additives, such as BHT, and titanium oxide. However, in consideration of the safety, the amount of the coat of such a zinc oxide is desirably as small as possible.

In the pigment of the present invention, the catalytic activity of titanium dioxide and/or oxide hydrate is inhibited by the silicon oxide coat of the first layer to thereby attain the anti-discoloring property, and the high dispersibility is attained by the aluminum oxide coat of the second layer so that the luster of the pigment does not lower. Further, the interaction of the other additives in the resin is inhibited by the zinc oxide coat of the third layer so that the pigment may have a satisfactory anti-discoloring property and is therefore durable for a long period of time.

In the present invention, provision of the above-mentioned three layers of the first to third layers is indispensable. Provision of only one layer or two layers of them is insufficient for attaining the object of the present invention, since the pigment could not maintain the excellent anti-discoloring property and good dispersibility and also the luster for a long period of time.

In accordance with the present invention, there is obtained a pearly pigment having a long-term anti-discoloring property, an excellent dispersibility with little coagulation and an excellent luster.

As a method of preparing the anti-discoloring pearly luster pigment of the present invention, the present invention provides a method of preparing an anti-discoloring pearly luster pigment, in which in a first step, titanium dioxide and/or titanium oxide hydrate coated mica particles are suspended in water or in which an aqueous solution of a titanium salt is added dropwise to an aqueous suspension of mica particles the pH of which is largely maintained at a constant value by simultaneous addition of a base, whereby titanium dioxide and/or titanium oxide hydrate is coated onto the surface of the mica particles, then in a second step, an aqueous solution of a silicate and an aqueous solution of an inorganic acid are simultaneously dropwise added to the suspension obtained in step 1 and stirred while maintaining the pH value of the suspension essentially constant whereby a silicon oxide and/or silicon oxide hydrate is coated over the surface of the titanium dioxide and/or titanium oxide hydrate coated mica particles, then in a third step an aqueous solution of an aluminum salt and an aqueous solution of an inorganic base are simultaneously dropwise added to the slurry resulting in step 2 and stirred while maintaining the pH value of the slurry essentially constant whereby an aluminum oxide and/or aluminum oxide hydrate is coated over the surfaces of the particles obtained in step 2, and further in a fourth step, an aqueous solution containing a zinc salt and an aqueous solution of an inorganic base are simultaneously dropwise added to the resulting slurry and stirred while maintaining the pH value of the slurry essentially constant whereby a zinc oxide and/or zinc oxide hydrate is coated over the surfaces of the particles obtained in step 3, and thereafter the solids are taken out by filtration, washed with water and dried and optionally calcined.

As the platelet like particles used as starting material which may be uncoated mica particles or mica particles coated with titanium dioxide and/or titanium oxide hydrate, generally usable are those having a grain size of from 2 to 200 µm and a thickness of from 0.2 to 5 µm, in particular 0.2–0.9 µm.

As the above-mentioned inorganic acid, for example, there are mentioned hydrochloric acid, sulfuric acid and nitric acid.

As the above-mentioned aqueous solution of an inorganic base, for example, there is mentioned an aqueous solution of containing sodium hydroxide or potassium hydroxide.

As the above-mentioned titanium salt, there are mentioned, for example, titanium chloride or bromide or titanyl sulfate.

As the above-mentioned silicate, for example, there are mentioned sodium silicate and potassium silicate.

As the above-mentioned aluminum salt, there are mentioned, for example, aluminum chloride, aluminum nitrate, aluminum sulfate, ammonium aluminum sulfate, sodium aluminum sulfate, and potassium aluminum sulfate.

As a material used for forming such a zinc oxide coat, there are mentioned, for example, zinc chloride and zinc sulfate.

During the different precipitation steps, mainly the respective oxide hydrates are formed which usually are at least partly converted to the respective oxides during the final step of drying and optionally calcining. The respective coating layers in the pigments of the present invention are not restricted to specific compositions but comprise all compositions from the respective oxide hydrate to the respective oxide.

It is also possible to filter off the intermediate pigment after at least one or more reaction steps 1–3 with subsequent washing, drying, optionally calcining and re-suspending of the intermediate pigment. This process is, however, rather time consuming and costly and is therefore less preferred especially for large scale productions. On the other hand, the conversion of the respective oxide hydrate to the respective oxide is usually found to be more complete in case intermediate drying and/or calcination steps are performed which is sometimes advantageous (higher thermal stability of the resulting pigment, higher luster due to reduced amount of cracks in the respective coating layers).

As examples of resins to which the anti-discoloring pearly luster pigment of the present invention may be applied, there are mentioned polyolefins such a polyethylene, polypropylene and polybutadiene; polyvinyls such as polyvinyl chloride, polyvinyl esters and polystyrene; as well as acrylalkylphenols, alkyd resins, amino resins, siloxanes, epoxy compounds, nylons, polyurethanes, phenoxy compounds, polysulfones, polycarbonates, polyesters, polyethers, acetals, polyimides, and polyoxyethylenes. Of them, preferred are polyolefin resins.

To the resins, additives may be added, if desired. As examples of additives, there are mentioned a reaction initiator, an antioxidant, a swelling agent, an ultraviolet absorbent, a dye, an organic pigment, a plasticizer, a levelling agent, a flame retarder and others.

The method of preparing the novel anti-discoloring pearly luster pigment of the present invention will be explained concretely hereunder.

First Step: Step of coating titanium oxide resp. oxide hydrate

The uncoated mica particles are suspended in an aqueous solution which by the addition of a suitable acid like hydrochloric acid or sulphuric acid is adjusted to a pH-value of about 0.5–5 and preferably of about 1.2–2.5. The suspension is preferably heated to a temperature of about 50°–100° C., preferably of about 70°–80° C. Subsequently, a solution of a titanium salt is slowly added to the mica slurry the pH of which being largely maintained at a constant value by simultaneous addition of a base such as, for example, NaOH. Especially preferred are $TiCl_4$ solutions which typically contain between 1°–40° C. by weight of $TiCl_4$. After the addition, the slurry is preferably stirred for 30 minutes or more with still maintaining the temperature as it is. Further details of the coating process can be taken, for example, from DE 20 09 566.

The resulting intermediate pigment which is coated with titanium dioxide and/or titanium oxide hydrate preferably contains 0.5–70% by weight, in particular 10–50% by weight of $TiO_2$ with respect to the mass of the uncoated mica gains.

The step of titanium dioxide resp. oxide hydrate coating can be omitted by starting the sequence of reaction steps with a pigment which is already coated with titanium dioxide resp. oxide hydrate instead on an uncoated mica grain. Such pigments which are commercially available from Merck Japan, for example as Iriodin® 100, Iriodin® 120 or Iriodin® 225, are described, for example, in Japanese Patent Publications Nos. 43-25,644 and 54-34,010.

Alternatively, the mica particles coated with titanium oxide and/or oxide hydrate can be filtered off after the first reaction step, washed with water, dried, optionally calcined and re-suspended to be further treated according to reaction steps 2–4.

The titanium oxide and/or hydrate coating can contain other not inherently colored components such as aluminum oxide resp. hydrate, tin oxide resp. hydrate etc. which are preferably coprecipitated with the titanium oxide resp. oxide hydrate. The term not inherently colored means that the additional components do not exhibit an absorption color so that the overall appearance of the titanium dioxide resp. oxide hydrate coated mica particles is white or whitish.

Pigments according to the present invention for which the first coating layer obtained in step 1 consists only of titanium oxide and/or oxide hydrate are preferred.

Second Step: Step of coating silicon oxide resp. oxide hydrate

The slurry obtained in reaction step 1 resp. the slimy of pre-fabricated titanium dioxide and/or oxide hydrate coated mica particles is adjusted to a pH value of about 9–10, for example, with sodium hydroxide. The slurry is heated up to 30° C. or higher, preferably 50° to 90° C., and an aqueous solution containing a necessary amount of a silicate is dropwise added thereto over a period of about one hour with stirring, while the slurry liquid is maintained at a pH value of from 9 to 10 with an acidic aqueous solution, such as an aqueous hydrochloric acid solution. After addition, the resulting slurry liquid is further stirred for 30 minutes or more with still maintaining the temperature thereof as it is.

Third Step: Step of coating aluminum oxide hydrate

The pigment-containing slurry liquid is, after the above-mentioned silicon oxide hydrate coating step, adjusted to have a pH value of from 5 to 6 with, for example, an aqueous hydrochloric acid solution. Then, a necessary amount of an aqueous solution of an aluminum salt is dropwise added thereto over a period of about one hour, while the pH value of the reaction system is maintained within the range of from 5 to 6 with an alkaline aqueous solution such as an aqueous sodium hydroxide solution. After addition, the resulting slurry liquid is further stirred for 30 minutes or more while still maintaining the temperature thereof as it is.

Fourth Step: Step of coating zinc oxide hydrate

The pigment-containing slurry liquid is, after the above-mentioned aluminum oxide hydrate coated step, adjusted to have a pH value of from 6 to 7 with, for example, an aqueous sodium hydroxide solution. Then, a necessary amount of an aqueous solution of a zinc salt is dropwise added thereto over a period of about one hour, while the pH of the reaction system is maintained within the range of from 6 to 7 with an alkaline aqueous solution such as an aqueous sodium hydroxide solution. After addition, the resulting slurry is stirred for 30 minutes and the pH value thereof is adjusted to be from 8 to 9 with an aqueous alkaline solution such as an aqueous sodium hydroxide solution. Then, it is further stirred for 10 minutes or more while still maintaining the temperature thereof as it is.

Fifth Step: Drying Step

After the first to fourth steps, the product formed is taken out by filtration, washed with water and dried (typically at 80° to 150° C., for 10 to 15 hours). Optionally, the product can be calcined at temperatures typically from about 700°–900° C., especially about 800° C.

Especially preferred are the following specific methods of preparation.

Method A:

Step 1: omitted; a pre-fabricated mica particle coated with titanium oxide and/or titanium oxide hydrate is used Steps 2–4: as described above Step 5: calcination step is omitted Method B:

Step 1: uncoated mica is used as starting material which is coated with titanium oxide and/or titanium oxide hydrate as described above Steps 2–4: as described above Step 5: calcination step is performed, preferably at temperatures of about 800° C.

Both Methods A and B provide pigments according to the present invention with excellent anti-yellowing properties. Method B, however, is often preferred because it is advantageous from a technical and economical point of view.

The product as obtained by the above mentioned steps has a pertinent pearly luster and dispersibility. As a result of an anti-yellowing test applied thereto, it has been confirmed that the product has a far better anti-discoloring property than conventional pearly luster pigments.

The present invention will be explained in more detail by way of the following examples, comparative examples and test examples, which, however, are not intended to restrict the scope of the present invention.

Example 1

800 g of pearly luster pigment particles comprising about 38 parts by weight of titanium dioxide-coated mica and having a particle size of from 5 to 20 μm (Iriodin® 120, produced by Merck Japan) were suspended in 8 liters of water and heated up to 75° C. with stirring. An aqueous sodium hydroxide solution was added to the slurry so that the pH value thereof was adjusted to be 9.3; and an aqueous 10% solution of 66 g of sodium silicate (3 parts by weight as $SiO_2$, to 100 parts by weight of Iriodin® 120) was dropwise added thereto over a period of about 1 hour, while the pH value of the slurry liquid was maintained to be 9.3 with an aqueous 3% hydrochloric acid solution. After all the aqueous sodium silicate solution was dropwise added thereto, the whole was stirred for 30 minutes at a temperature of 75° C. Next, an aqueous 3% solution of 19 g of aluminum chloride hexahydrate $AlCl_3.6H_2O$ (one part by weight as $Al_2O_3$ to 100 parts by weight of Iriodin® 120) was dropwise added thereto over a period of about one hour, while the pH value of the slurry liquid was maintained to be 5.5 with an aqueous 5% solution of sodium hydroxide. After all the aqueous aluminum salt solution was dropwise added thereto, the whole was stirred for 30 minutes at 75° C. Further, an aqueous 2% solution of 13.4 g of zinc chloride $ZnCl_2$ (one part by weight as ZnO to 100 parts by weight of Iriodin® 120) was dropwise added thereto over a period of about one hour, while the pH value of the slurry liquid was maintained to be 6.5 with an aqueous 5% solution of sodium hydroxide. After addition, the whole was continuously stirred for a further 30 minutes at 75° C., then an aqueous 5% solution of sodium hydroxide was gradually dropwise added thereto so that the pH value of the slurry liquid was elevated up to 8. This was then continuously stirred for a further 10 minutes at 75° C. The solid product thus formed was taken out by filtration, washed with water and dried at 130° C. for 12 hours. This was then sieved through a 250-mesh sieve. The pigment thus obtained was applied to resins, which showed an excellent dispersing property.

Examples 2 to 5

The same process as in Example 1 was repeated, using 800 g of the same titanium dioxide-coated pearly pigment, except that the amounts of the surface-treating agents as applied to the pigment were varied to those indicated in Table 1 below. All the coated pigments thus obtained showed an excellent dispersing property when applied to resins.

Example 6

An aqueous 42% solution of 438.6 g $TiCl_4$ was added dropwise within a period of about 1 hour at a temperature of 75° C. to an aqueous suspension of 800 g of uncoated mica particles (particle size 10–50 μm) at a pit of 2.2 which was largely kept constant by simultaneous addition of an aqueous 32% NaOH solution. After all the $TiCl_4$ solution was added dropwise thereto, the whole was stirred for 30 minutes at a temperature of 75° C. The resulting intermediate pigment exhibits a $TiO_2$ content of 29% with respect to the mass of uncoated mica.

Then, an aqueous sodium hydroxide solution was added to the slurry liquid so that the pH value thereof was adjusted to be 9.3; and an aqueous 15% solution of 35.4 g of sodium silicate (2 parts by weight as $SiO_2$, to 100 parts by weight of titanium dioxide and/or oxide hydrate coated mica) was dropwise added thereto over a period of about 1 hour, while the pH value of the slurry liquid was maintained to be 9.3 with an aqueous 20% hydrochloric acid solution. After all the aqueous sodium silicate solution was dropwise added thereto, the whole was stirred for 30 minutes at a temperature of 75° C. Next, an aqueous 6% Solution of 15 g of aluminum chloride hexahydrate $AlCl_3·6H_2O$ (one part by weight as $Al_2O_3$ to 100 parts by weight of titanium dioxide and/or oxide hydrate coated mica) was dropwise added thereto over a period of about one hour, while the pH value of the slurry liquid was maintained to be 5.5 with an aqueous 32% solution of sodium hydroxide. After all the aqueous aluminum salt solution was dropwise added thereto, the whole was stirred for 30 minutes at 75° C. Further, an aqueous 4% solution of 10.65 g of zinc chloride $ZnCl_2$ (one part by weight as ZnO to 100 pans by weight of titanium dioxide and/or hydrate coated mica) was dropwise added thereto over a period of about one hour, while the pH value of the slurry liquid was maintained to be 6.5 with an aqueous 32% solution of sodium hydroxide. After addition, the whole was continuously stirred for further 30 minutes at 75° C., then an aqueous 32% solution of sodium hydroxide was gradually dropwise added thereto so that the pH value of the slurry liquid was elevated up to 8. This was then continuously stirred for a further 10 minutes at 75° C. The solid product thus formed was taken out by filtration, washed with water, dried at 130° C. for 12 hours and calcined at 800°–900° C. for 0.5 hours. This was then sieved through a 325-mesh sieve. The pigment thus obtained was applied to resins, which showed an excellent dispersing property.

Example 7 to 8

The same process as in Example 6 was repeated, using 452 g of the same uncoated mica particles, except that the amounts of the surface-treating agents as applied to the pigment were varied to those indicated in Table 1 below. All the coated pigments thus obtained showed an excellent dispersing property when applied to resins.

Comparative Example 1

The same process as in Example 1 was repeated, using 800 g of the same titanium dioxide-coated pearly pigment, except that no zinc salt was added and that the amounts of the other surface-treating agents were varied to those indicated in Table 1 below. When the coated pigment thus obtained was applied to resins, there was no problem on the dispersibility of the pigment, but with the lapse of time, yellowing of the resins was observed. As a result, the coated pigment (comparative sample) obtained herein was recognized to have a problem on the anti-discoloring properly.

Comparative Example 2

The same process as in Example 1 was repeated, using 800 g of the same titanium dioxide-coated pearly pigment, except that no aluminum salt was added and that the amounts of the other surface-treating agents were varied to those indicated in Table 1 below.

When the coated pigment thus obtained was applied to resins noticeable coagulation of the pigment grains was observed and the dispersibility of the pigment was not good.

Comparative Example 3

The same process as in Example 1 was repeated, using 800 g of the same titanium dioxide-coated pearly pigment, except that no silicate was added and that the amounts of the other surface-treating agents were varied to those indicated in Table 1 below.

When the coated pigment thus obtained was applied to resins, there was no problem on the dispersibility of the pigment, but with the lapse of time, the resins yellowed like the case of Comparative Example 1. As a result, the coated pigment (comparative sample) obtained herein was recognized to have a problem on the anti-discoloring property.

TABLE 1

| Sample | Surface-treating Agent (wt. pts.) | | | Dispersibility |
|---|---|---|---|---|
| | Silicon Oxide | Aluminum Oxide | Zinc oxide | |
| Example 1 | 3.0 | 1.0 | 1.0 | Good |
| Example 2 | 2.0 | 2.0 | 1.0 | Good |
| Example 3 | 2.5 | 1.0 | 1.0 | Good |
| Example 4 | 3.5 | 1.0 | 1.0 | Good |
| Example 5 | 4.5 | 1.0 | 1.0 | Good |
| Example 6 | 2.0 | 1.0 | 1.0 | Good |
| Example 7 | 4.0 | 1.0 | 1.0 | Good |
| Example 8 | 6.0 | 1.0 | 1.0 | Good |
| Comparative Example 1 | 2.5 | 2.5 | — | Good |
| Comparative Example 2 | 1.0 | — | 1.0 | No Good |
| Comparative Example 3 | — | 2.0 | 2.0 | Good |

The samples prepared above were tested in tile manner mentioned below and the test results are shown in the following tables.

1) Formation of Test Pieces:

One g of a sample to be tested was well blended with 0.1 g of an antioxidant (BHT, Yoshinox, trade name by Yshitomi Pharmaceutical Co). and 98.9 g of HDPE (Diapolymer, Mitsubishi Polyethylene Jx10), and the resulting mixture was shaped by injection molding to obtain test pieces each having a size of 24.5 cm length×7.3 cm width×0.2 cm thickness.

Method of Testing Light Resistance

A photo-cabinet was used, which had one black lamp (20 W, produced by Nippo Co.) as a light source. The black lamp emits essentially ultraviolet rays. The test pieces prepared above were put in the photo-cabinet with a distance of about 20 cm from the light source, for 2 weeks, and the b value of them was measured with a colorimeter (CR-200 Model, produced by Minolta Co. ). The difference between the b values (Δb) of the test pieces before and after the test was calculated out. The results obtained are shown in Table 2 below.

TABLE 2

| Sample | Δb |
|---|---|
| Iriodin ® 120 (non-treated) | 5.0 |
| Example 1 | 0.3 |
| Example 2 | 1.0 |
| Example 3 | 1.1 |
| Example 4 | 0.8 |
| Example 5 | 0.6 |
| Example 6 | 0.1 |
| Example 7 | 0.1 |
| Example 8 | 0.0 |

TABLE 2-continued

| Sample | Δb |
|---|---|
| Comparative Example 1 | 2.4 |

3) Method of Measuring Luster:

One g of a sample pigment to be tested was weighed in a beaker, and 9 g of an ink medium (VS Medium, produced by Dai-Nippon Seika KK) was added thereto and fully stirred and blended to give a uniform mix. This was coated on a white-black calendered paper with a bar coater No. 20 and dried, and the L value of the coated paper was measured with the same colorimeter as that mentioned above over the black background. The results obtained are shown in Table 3 below.

TABLE 3

| Sample | L value |
|---|---|
| Example 1 | 69.9 |
| Example 2 | 69.5 |
| Example 3 | 69.3 |
| Example 4 | 69.8 |
| Example 5 | 69.3 |
| Comparative Example 1 | 68.7 |

As explained in detail in the above, the anti-disoloring pearly luster pigment of the present invention has excellent anti-discoloring property and dispersing property, and it still maintains the intrinsic gloss of the titanium dioxide and/or oxide hydrate coated mica particles. Therefore, the pigment of the present invention is used as a pigment ingredient in plastic articles, inks, coating compositions, decorative boards and others.

While the invention has been described in detail and with reference to specific embodiments thereof, it will be apparent to one skilled in the art that various changes and modifications can be made therein without departing from the spirit and scope thereof.

What is claimed is:

1. An anti-discoloring pearly luster pigment comprising mica particles coated with titanium dioxide and/or titanium oxide hydrate wherein:

(a) the outer surface of the titanium dioxide and/or titanium oxide hydrate coated mica particles are coated with from 1 to 7 parts by weight, based on 100 parts by weight of the titanium dioxide and/or titanium oxide hydrate coated mica particles, of a silicon oxide and/or silicon oxide hydrate;

(b) the outer surface of the thus-coated particles are further coated with from 0.5 to 5 parts by weight, based on 100 parts by weight of the titanium dioxide and/or titanium oxide hydrate coated mica particles, of an aluminum oxide and/or aluminum oxide hydrate; and (c) the outer surface of the thus-coated particles are still further coated with from 0.5 to 3 parts by weight, based on 100 parts by weight of the titanium dioxide and/or titanium oxide hydrate coated mica particles, of a zinc oxide and/or zinc oxide hydrate.

2. The pigment of claim 1, wherein the titanium oxide and/or titanium oxide hydrate coating is from 0.5 to 250% by weight of the mica particles.

3. The pigment of claim 1, wherein the mica particles have a grain size of 2 to 200 μm and a thickness of 0.2 to 5 μm.

4. A method of preparing an anti-discoloring pearly luster pigment, comprising a first step of suspending titanium dioxide and/or titanium oxide hydrate coated mica particles in water or adding dropwise an aqueous solution of a titanium salt to an aqueous suspension of mica particles the pH of which is largely maintained at a constant value by simultaneous addition of a base, whereby titanium dioxide and/or titanium oxide hydrate is coated onto the surface of the mica particles, then in a second step simultaneously dropwise adding an aqueous solution of a silicate and an aqueous solution of an inorganic acid to the suspension obtained in the first step and stirring while maintaining the pH value of the suspension essentially constant, whereby a silicon oxide and/or silicon oxide hydrate is coated over the surface of the titanium dioxide and/or titanium oxide hydrate coated mica particles, then in a third step simultaneously dropwise adding an aqueous solution of an aluminum salt and an aqueous solution of an inorganic base to the slurry resulting from the second step and stirring while maintaining the pH value of the slurry essentially constant, whereby an aluminum oxide and/or aluminum oxide hydrate is coated over the surfaces of the particles obtained in the second step, and further in a fourth step simultaneously dropwise adding an aqueous solution containing a zinc salt and an aqueous solution of an inorganic base to the resulting slurry from the third step and stirring while maintaining the pH value of the slurry essentially constant, whereby a zinc oxide and/or zinc oxide hydrate is coated over the surfaces of the particles obtained in the third step, and thereafter taking out the solids by filtration, washing with water, drying and optionally calcining.

5. The method of claim 4, wherein the inorganic acid is hydrochloric acid, sulfuric acid or nitric acid.

6. The method of claim 4, wherein the aqueous solution of inorganic base is an aqueous solution containing sodium hydroxide or potassium hydroxide.

7. The method of claim 4, wherein the titanium salt is titanium chloride, titanium bromide or titanyl sulfate.

8. The method of claim 4, wherein the silicate is sodium silicate or potassium silicate.

9. The method of claim 4, wherein the aluminum salt is aluminum chloride, aluminum nitrate, aluminum sulfate, ammonium aluminum sulfate, sodium aluminum sulfate, or potassium aluminum sulfate.

10. The method of claim 4, wherein the zinc salt is zinc chloride or zinc sulfate.

11. The method of claim 4, wherein an intermediate pigment is filtered off after one or more of the first to third steps of the method.

12. The method of claim 4, wherein, in the first step, titanium dioxide and/or titanium oxide hydrate coated mica particles are suspended in water and there is no final calcination step.

13. The method of claim 4, wherein, in the first step, an aqueous solution of a titanium salt is added dropwise to an aqueous suspension of mica particles whereby titanium dioxide and/or titanium oxide hydrate is coated onto the surface of the mica particles and a final calcination step is conducted.

14. A resin containing an anti-discoloring pearly luster pigment as claimed in claim 1 and at least one resin.

15. The resin composition of claim 14, wherein the at least one resin is a polyolefin, polyvinyl resin, acrylalkylphenol resin, alkyd resin, amino resin, siloxane resin, epoxy resin, nylon resin, polyurethane resin, phenoxy resin, polysulfone resin, polycarbonate resin, polyester resin, polyether resin, acetal resin, polyimide resin or polyoxyethylene resin.

16. The resin composition of claim 14, wherein the at least one resin is a polyolefin.

* * * * *